United States Patent [19]

Suman et al.

[11] Patent Number: 4,600,240
[45] Date of Patent: Jul. 15, 1986

[54] HEADREST CONTROL

[75] Inventors: Michael J. Suman, Holland; Kim L. Van Order, Hamilton; Russell L. Clark, Zeeland; Ted W. Haan, Wyoming, all of Mich.

[73] Assignee: Prince Corporation, Holland, Mich.

[21] Appl. No.: 587,988

[22] Filed: Mar. 9, 1984

[51] Int. Cl.⁴ .............................................. A47C 7/36
[52] U.S. Cl. ................................. 297/408; 188/77 W; 188/82.6; 297/374; 403/19; 403/116; 403/379
[58] Field of Search ................. 297/374, 408; 403/19, 403/116, 357, 379; 192/8 C; 188/77 W, 82.6

[56] References Cited

U.S. PATENT DOCUMENTS

| 870,910 | 11/1907 | Splittgerber | 403/116 X |
|---|---|---|---|
| 1,132,375 | 3/1915 | Myers | 403/379 X |
| 1,856,534 | 5/1932 | Boery | 297/373 |
| 2,287,725 | 6/1942 | Conte | 403/379 X |
| 2,839,125 | 6/1958 | Brandon | 297/408 X |
| 3,186,763 | 6/1965 | Ferrara | 297/408 |
| 3,285,657 | 11/1966 | Gaston | 297/374 |
| 3,347,485 | 10/1967 | Bundschuh | 403/357 X |
| 3,350,135 | 10/1967 | Martens | 297/355 |
| 3,423,785 | 1/1969 | Pickles | 297/374 X |
| 3,586,366 | 6/1971 | Patrick | 297/391 |
| 3,602,547 | 8/1971 | Tabor | 297/374 |

Primary Examiner—William E. Lyddane
Assistant Examiner—Peter R. Brown
Attorney, Agent, or Firm—Price, Heneveld, Huizenga & Cooper

[57] ABSTRACT

A headrest includes a unidirectional clutch permitting adjustment of the headrest from a reference position to any desired selected position and resists motion in a rearward direction except upon release of the clutch. In one embodiment of the invention, a spring return mechanism is provided to automatically return the headrest to a reference position upon release of the clutch.

3 Claims, 9 Drawing Figures

1

HEADREST CONTROL

BACKGROUND OF THE INVENTION

The present invention pertains to adjustable vehicle headrests, and particularly, adjustment mechanism therefor.

Vehicle headrests which are adjustable have been provided with somewhat complex mechanisms for providing either continuous stiff friction clutches, or in some cases, ones with a spring clutch which can be released upon actuation of a release lever. U.S. Pat. Nos. 2,839,125 3,186,763; and 3,586,366; are representative of such prior art headrests.

Such headrests do not provide automatic return to a reference position upon actuating a release lever or do not permit adjustability to a selected position without manually operating the control lever and at the same time, physically manipulating the headrest. Thus, the prior headrests can be difficult and cumbersome to adjust, particularly when the vehicle is in operation.

SUMMARY OF THE PRESENT INVENTION

The headrest of the present invention obviates the difficulties encountered in the prior art adjustable headrest by providing a headrest which includes a unidirectional friction clutch permitting adjustment of the headrest from a reference position to any desired selected position and resists subsequent motion toward the reference position except upon release of the clutch. In one embodiment of the invention, a spring return mechanism is provided to automatically return the headrest to a reference position upon release of the clutch. According to another aspect of the invention, an improved compact spring clutch assembly is provided. According to a further aspect of the invention, an improved release control is provided.

The resultant headrest structure permits relatively easy adjustment of the headrest from a reference position to an infinite number of use positions and maintains the headrest in the manually adjusted position until such time as desired to return the headrest. By employing an improved, releasable, unidirectional clutch, therefore, the headrest is relatively easily adjusted without requiring operation of a release lever except when it is desired to move the headrest rearwardly.

These and other features, objects and advantages of the present invention will become apparent upon reading the following description thereof together with reference to the accompanying drawings in which:

DETAILED DESCRIPTION OF THE PREFERRED EMBODIMENTS

Figure 1:
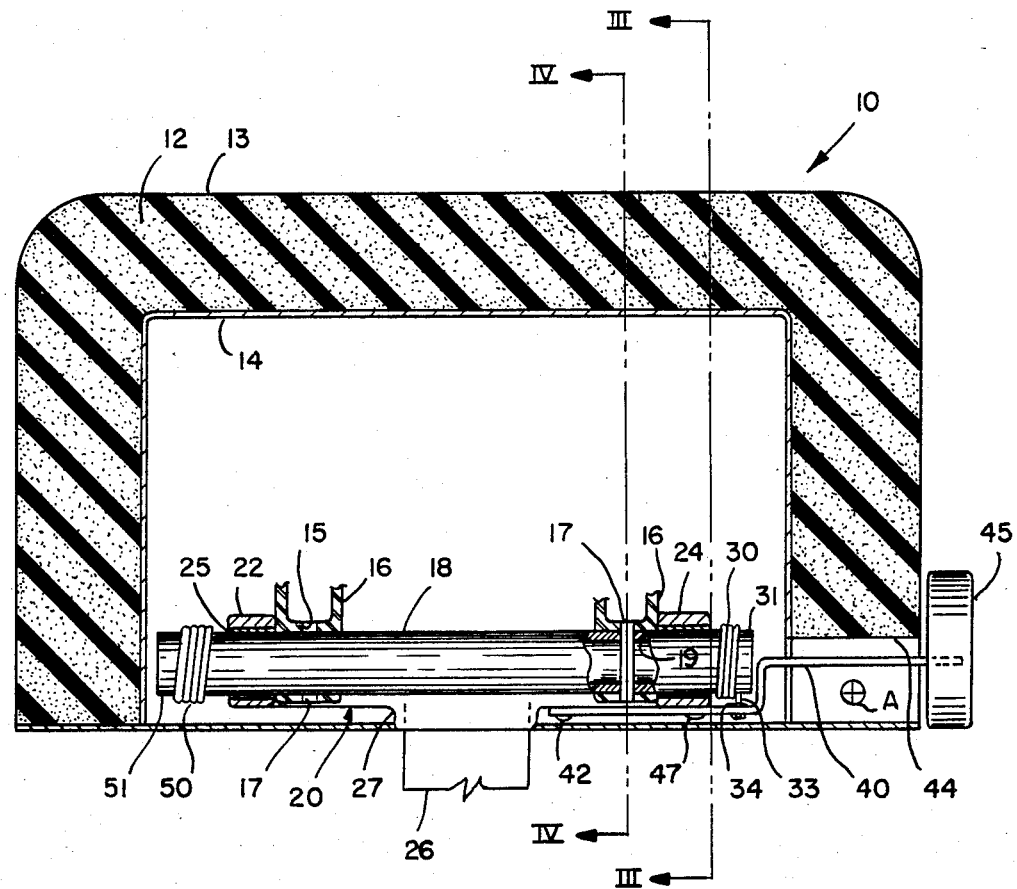
FIG. 1 is a front, vertical, cross-sectional view, partly in fragmentary form, of a headrest embodying the present invention.

Referring initially to FIGS. 1-4, an adjustable headrest 10 embodying the present invention is shown and includes a foam cushion 12 covered by an upholstery material 13 conforming the appearance of the headrest to the vehicle's interior. The cushion 12 is molded over a rigid, generally box-like, hollow support 14 forming an interior core for the cushion. As can be seen in reference to FIGS. 3 and 4, both the cushion 12 and the core 14 are curvilinear to provide a functional and aesthetically pleasing configuration for the headrest. Core 14 is anchored by integral brackets 16 at spaced locations to and along axle 18 by means of press-fit roll pins 17. Pins 17 extend through apertures 15 formed in the brackets 16 and through apertures 19 in the hollow, cylindrical axle 18. Thus, the headrest cushion 12 and its core 14 are rigidly secured to the axle 18 and move simultaneously with the rotation of the axle for adjustment of the headrest.

Axle 18 is pivotally mounted within a generally U-shaped, fixed bracket 20 having end legs 22 and 24, each with apertures and bushings 25 therein for permitting rotation of the axle 18 with respect to the fixed bracket 20. Bracket 20, in turn, is secured to the seat of a vehicle by means of a stem 26 which is fitted within a socket 27 formed along the bottom of bracket 20 and conventionally secured therein by, for example, a press-fit or the like. Stem 26 is conventionally secured within the back of the vehicle seat either in an adjustable manner for raising and lowering the headrest or in a fixed position.

In order to lock the movable headrest 10 with respect to the fixed bracket 20, a spring clutch is employed. The spring clutch includes a coil spring 30 extending over the end 31 of axle 18 which extends through leg 24 of bracket 20. The spring 30 has one end 33 extending through and anchored to a ferrel 34 in a movable control arm 40 and an opposite end 35 which extends and is anchored within a ferrel 36 (FIG. 3) fitted in the front wall of core 14. Thus, one end 33 of spring 30 is anchored to the fixed bracket 20 through arm 40 while the opposite end 35 is anchored to the headrest through core 14.

Spring 30 has an inner diameter of 0.8 inches which is slightly smaller than the outside diameter of axle 18. The spring is thus wound tightly around axle 18 such that it prevents clockwise rotation (FIG. 3) of the headrest since such movement of axle 18 tends to tighten the grip of the interior surface of spring 30 against the outer cylindrical surface of axle 18 even further. Movement of the headrest and axle 18 in a counterclockwise or forward tilting position, however, expands the coil spring which loosens the grip of the spring on axle 18 allowing the axle and headrest to move in a counterclockwise or forwardly adjusted position. The extreme forward adjusted position of the headrest 12 is shown in phantom lines in FIG. 3.

Figure 2:
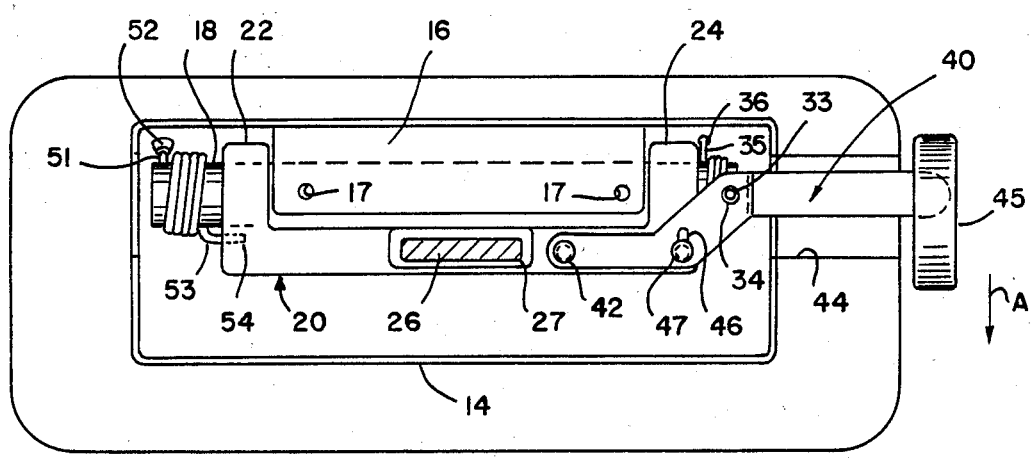
FIG. 2 is a bottom plan view of the headrest shown in FIG. 1.
Figure 3:
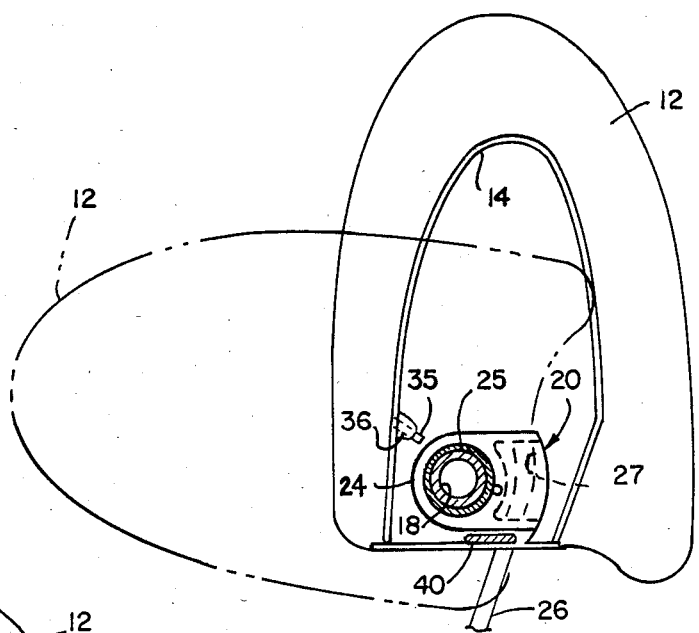
FIG. 3 is a cross-sectional view of the headrest shown in FIG. 1 taken along section line III—III of FIG. 1.
Figure 4:
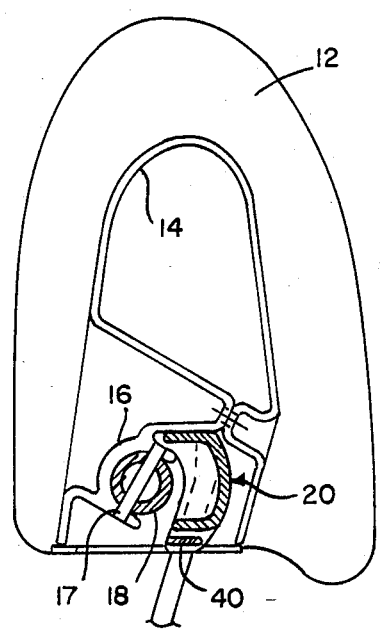
FIG. 4 is a cross-sectional view of the headrest shown in FIG. 1 taken along section line IV—IV of FIG. 1.
Figure 8:
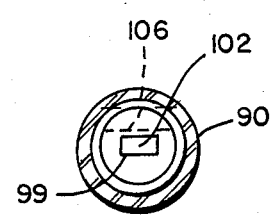
FIG. 8 is a cross-sectional view taken along section line VIII—VIII of FIG. 6.
Figure 9:
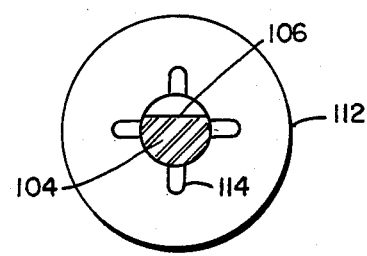
FIG. 9 is a cross-sectional view taken along section line IX—IX of FIG. 6.

In order to return the headrest 12 to a rearward or clockwise adjusted position, the release lever 40 which is pivotally mounted to bracket 20 by means of a pivot pin 42 at one end is moved rearwardly, as indicated by arrow A in FIGS. 1 and 2, which loosens the wrap of spring 30 around axle 18 permitting a return spring 50 loosely mounted to surround an opposite end 51 of axle 18 to urge the headrest in a clockwise direction, as viewed in FIG. 3. Spring 50 is not a clutch spring and is not tightly wrapped around axle 18 and thus axle 18 freely moves within the inner diameter of the spring. Spring 50 has one end 51 anchored within a ferrel 52 mounted to core 14, as illustrated in FIG. 2, and an opposite end 53 extending within an aperture 54 formed in bracket 20 such that it provides a spring force which causes relative movement between the core 14 and headrest cushion 12 mounted thereon and the fixed bracket 20 in a clockwise direction or a rearward return position, as illustrated in FIG. 3.

The control lever or arm 40 extends through a slot 44 formed in the headrest assembly to permit it to extend out to one side of the headrest where it terminates in a control knob 45. The lever 40 is stablized by means of a slot 46 and pin 47 mounted to the underside of the end 24 of bracket 20 to guidably support the control arm 40 in its movement about pivot point 42.

Thus, with the structure shown in FIGS. 1-4, a spring clutch 30 is used for releasably locking the headrest in an adjusted position. The headrest can be moved forwardly to a desired position without moving lever 40. The spring 30 holds the release lever 40 in a locking position until manually operated to unwind the spring and allow the headrest to return to the rearward position under the force of return spring 50. The headrest thus can be adjusted by the user to any selected position by merely pulling the headrest forwardly from its rearmost retracted position and releasing the headrest whereupon it will remain in a locked adjusted position until knob 45 is moved to a rearward headrest releasing position whereupon the headrest moves fully rearwardly.

An alternative embodiment of the invention is shown in FIGS. 5-9 in which a headrest 60 is provided and includes a foam, polymeric cushion 62 molded onto a sheet metal core member 64 which, in turn, is secured to a hinge plate 66. In the embodiment shown in these Figures, the hinge plate 66 pivotally moves in an arc on an axle 70 to tilt the headrest in an adjusted position. Axle 70, in turn, is secured to a support stem 26 extending upwardly from a seat 23 of a vehicle. Stem 26 includes a trifurcated end with the outermost forks 28 extending along one side of axle 80 and the center fork 29 extending on an opposite side of the axle and secured thereto by means of bolts 32 fixing the axle to the ends of the forks of stem 26.

Figure 5:
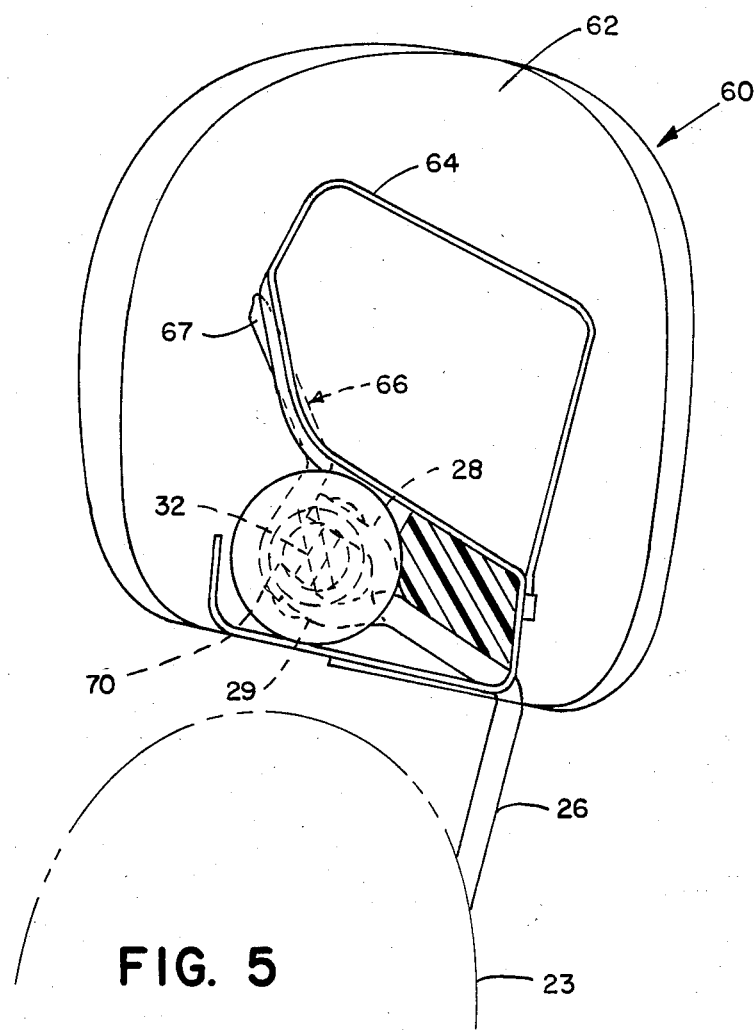
FIG. 5 is a left side elevational view of an alternative embodiment of the present invention.
Figure 6:
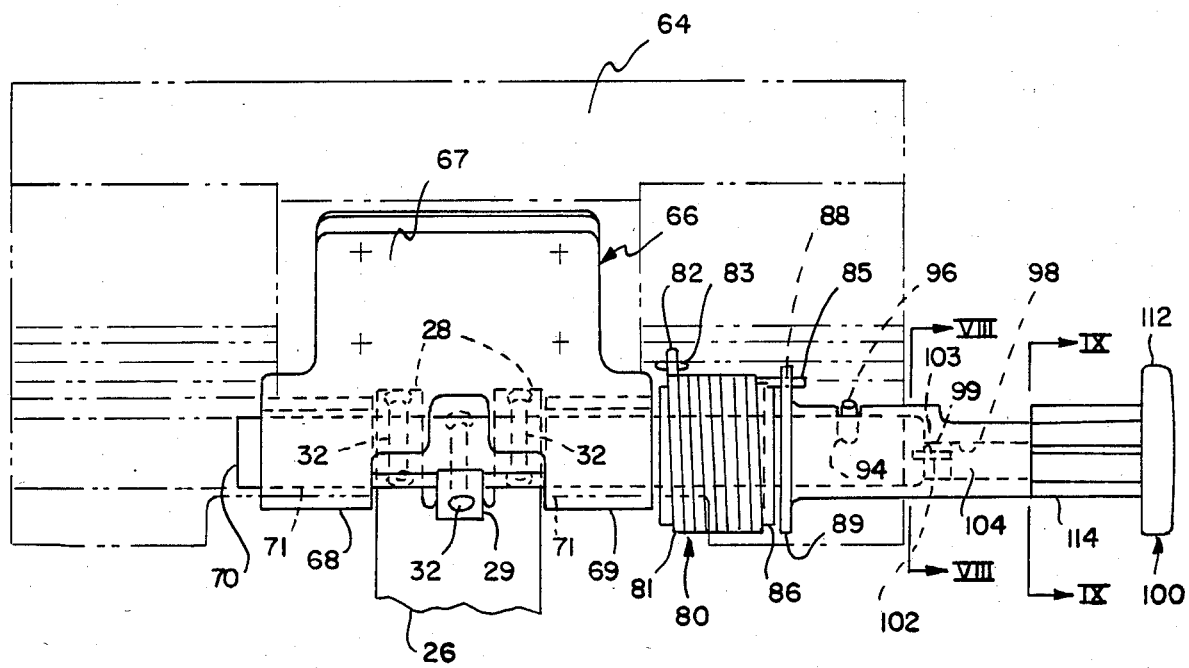
FIG. 6 is a front elevational view of a portion of the structure shown in FIG. 5.
Figure 7:
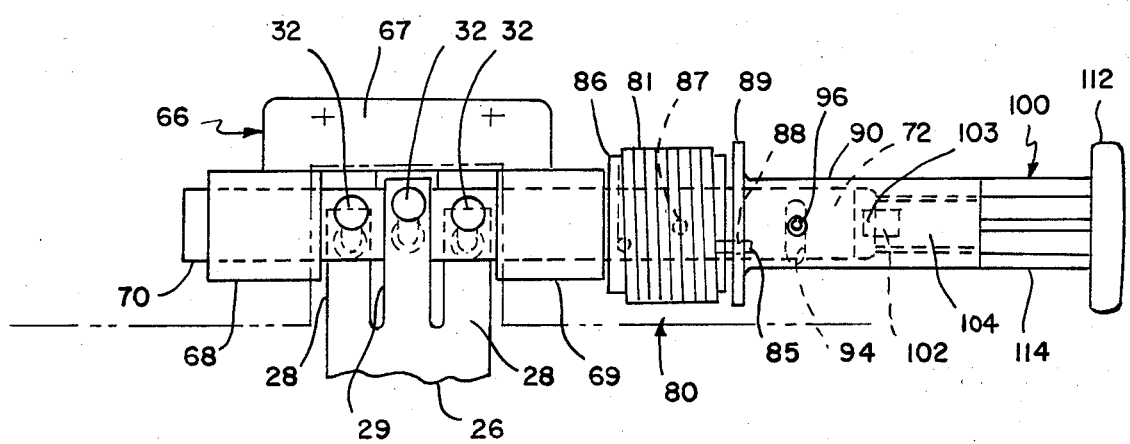
FIG. 7 is a bottom plan view of a portion of the structure shown in FIG. 6.

The hinge plate 66 has a tang 67 which is welded directly to the core 64 along a front inclined surface thereof, as illustrated in FIG. 5. Connected to the tang 67 of the hinge plate are a pair of spaced end legs 68 and 69 which are curved to loosely surround axle 70. Bearing sleeves 71, made of a lubricious polymeric material, are fitted between hinge members 68 and 69 and axle 70 to provide smooth adjustment of the headrest. To lock headrest 60 with respect to the stationary axle 70, a clutch spring assembly 80 is provided. Assembly 80 is structurally different than the clutch spring of the first embodiment but operates in a similar manner. Assembly 80 includes a coil spring 81 which is a relatively compact but large diameter spring. Thus, spring 81 has a length of about 0.85 inches but an internal diameter of 1.25 inches. The use of the large diameter spring will, for a given length, increase the gripping area of the internal cylindrical surface of the spring. By employing a large diameter spring therefore, a shorter and more compact spring can be employed which will easily fit within the headrest in the somewhat limited width available. Since the solid axle 70 has a relatively small outer diameter, a spacer sleeve 86 is coaxially mounted to axle 70 and secured thereto by at least one roll pin 87 extending through aligned apertures in sleeve 86 and axle 70. Sleeve 86 is axially aligned under spring 81 and has an outer diameter of 1.260 inches such that the spring will, when installed, initially impart a gripping force on sleeve 86 and hence axle 70.

Spring 81 has one end 82 anchored within a slot 83 formed in the core member 64 of the headrest. The opposite end 85 of spring 80 extends within an aperture 88 formed in a circular flange 89 which is integral with a clutch control member 90 coaxially mounted on the end 72 of axle 70. In the preferred embodiment of FIGS. 5-9, spring 81 was made of eight turns of piano wire with a square cross section with each side having a length of 0.1 inches.

Member 90 is a generally cylindrically shaped sleeve held on shaft 70 by means of an arcuate slot 94 extending through its cylindrical sidewall and a pin 96 extending upwardly through slot 94. Pin 96 is a roll pin fitted within an aperture radially formed within axle 70 once the end 89 of sleeve 90 has been positioned over the end 72 of the shaft in alignment with slot 94.

Sleeve 90 forms, in part, the release mechanism for the headrest, shown in FIGS. 5-9, and has a configurated socket 98 formed in an end remote from flange 89 for receiving a control knob assembly 100. The socket 98 includes a generally rectangular slot 99 (FIG. 8) at its end for receiving a locking tab 102 of knob assembly 100 which extends from the end of the generally cylindrical shaft 104 of the knob assembly 100. Shaft 104 includes a flat 106 (FIG. 9) formed therein for rotationally locking shaft 104 within the similarly shaped keyway 110 forming the sidewalls of socket 98. The tab 102 has a slightly enlarged, rounded end 103 which allows the knob assembly 100 to be axially slid within socket 98 and snap-locked into position. The knob assembly 100 integrally includes a knob 112 secured at the end of an extension shaft 114, the length of which can be selected for different vehicle installations. Thus, the knob assembly 100 which snap-fits within releasing mechanism including sleeve 90 permits the use of the headrest control mechanism for a variety of vehicles in which the knob extension may be longer or shorter as necessary to provide access at one side of a headrest.

Spring 81, like spring 30, has an inner surface which tightly grips the outer cylindrical surface of the sleeve 86 preventing movement of the headrest 62 in a clockwise or rearward position, as illustrated in FIG. 5. The headrest, however, can move in a counterclockwise direction tending to unwind spring 81 from sleeve 86 thus allowing the headrest to be moved forwardly to a desired position where the spring will resist rearward movement.

In order to adjust the headrest rearwardly, the control sleeve 90 is rotated in a clockwise or rearward position by knob 112 causing spring 81 to loosen by unwinding end 85 thereof within the arcuate constraints of slot 94 which is sufficient to allow the headrest to be manually moved rearwardly. The manual release of knob 100 causes spring 81 to rotate sleeve 90 counterclockwise and again grip the sleeve 86 coupled to fixed axle 70 for locking the headrest in a rearward adjusted position. As with the first embodiment, therefore, the headrest can be freely moved forwardly to an adjust position and held in such position but can be moved rearwardly against the action of a clutch spring only upon manually releasing the clutch mechanism.

If desired, a return spring can also be added to the second embodiment shown in FIGS. 5–9. These and other modifications to the preferred embodiments of the invention will, however, fall within the spirit and scope of the invention as defined by the appended claims.

The embodiments of the invention in which an exclusive property or privilege is claimed are defined as follows:

1. A vehicle headrest adjustment mechanism including a headrest which is adjustable about a pivot axle, said mechanism comprising:

a spring clutch having a relatively short, large diameter coil spring surrounding an axle about which the headrest pivots said spring having an inner diameter greater than its axial length;

a cylindrical sleeve secured to said axle in axial alignment with said coil spring and extending axially beyond the ends of said spring, said sleeve having an outer diameter slightly greater than the inner diameter of said coil spring and significally greater than the diameter of said axle to thereby increase the effective clutch working surface;

means engaging said spring for releasing the gripping action of said spring from said sleeve whereby said headrest can be pivoted rearwardly, said headrest being pivotable to a forwardly adjusted position without actuation of said release means;

said release means comprising a second cylindrical sleeve rotatably fitted over an end of said axle and coupled to said coil spring to release the gripping force of said coil spring on said first named sleeve when said second sleeve is rotated in a first direction;

said second sleeve including socket means formed in an end opposite said spring for releasably receiving a control shaft; and a control shaft with a first end configured to extend within said socket whereby different lengths of control shafts can be selected for different widths of headrests so as to provide for the control shaft to extend outwardly beyond an edge of the headrest for access by a user.

2. The apparatus as defined in claim 1 wherein said socket includes an end wall with an opening and wherein said first end of said control shaft includes a tab which extends through said opening and snap-locks said control shaft to said sleeve.

3. The apparatus as defined in claim 2 wherein said control shaft includes a knob at an end opposite said first end.

* * * * *

UNITED STATES PATENT AND TRADEMARK OFFICE
CERTIFICATE OF CORRECTION

PATENT NO. : 4,600,240
DATED : July 15, 1986
INVENTOR(S) : Michael J. Suman, et al.

It is certified that error appears in the above-identified patent and that said Letters Patent is hereby corrected as shown below:

Column 1, line 13:
after "2,839,125" insert --,--;

Column 3, line 17:
"stablized" should be --stabilized--;

Column 5, line 23, claim 1:
"significally" should be --significantly--.

Signed and Sealed this

Sixteenth Day of December, 1986

Attest:

DONALD J. QUIGG

Attesting Officer

Commissioner of Patents and Trademarks